United States Patent [19]

Blechinger

[11] 4,418,578
[45] Dec. 6, 1983

[54] LOW NOISE VORTEX SHEDDING FLUID FLOW SENSOR

[75] Inventor: Chester J. Blechinger, Bloomfield Hills, Mich.

[73] Assignee: Ford Motor Company, Dearborn, Mich.

[21] Appl. No.: 401,447

[22] Filed: Jul. 26, 1982

[51] Int. Cl.³ .............................................. G01F 1/32
[52] U.S. Cl. ................................................. 73/861.22
[58] Field of Search ........... 73/861.21, 861.22, 861.23, 73/861.34

[56] References Cited

U.S. PATENT DOCUMENTS 3,116,639 1/1964 Bird .
3,680,375 8/1972 Joy .
3,895,530 7/1975 Paetzold .......................... 73/861.34

OTHER PUBLICATIONS

"Drag and Heat-Transfer Characteristics of Small Longitudinally Ribbed Surfaces" by M. J. Walsh and L. M. Weinstein, AIAA Journal, vol. 17, No. 7, pp. 770 and 771, 1978.
"Drag Characteristics of V-Groove and Transverse Curvature Riblets" by Michael J. Walsh, Viscous Flow Drag, pp. 168-184, vol. 72 of Progress in Astronautics and Aeronutronics, Published by AIAA, 1980.

Primary Examiner—Herbert Goldstein
Attorney, Agent, or Firm—Peter Abolins; Robert D. Sanborn

[57] ABSTRACT

A vortex generator of triangular cross section has ridges on the upstream surfaces. Ridges which extend longitudinally in a direction parallel to the flow are located on the wall.

6 Claims, 5 Drawing Figures

U.S. Patent  Dec. 6, 1983  4,418,578
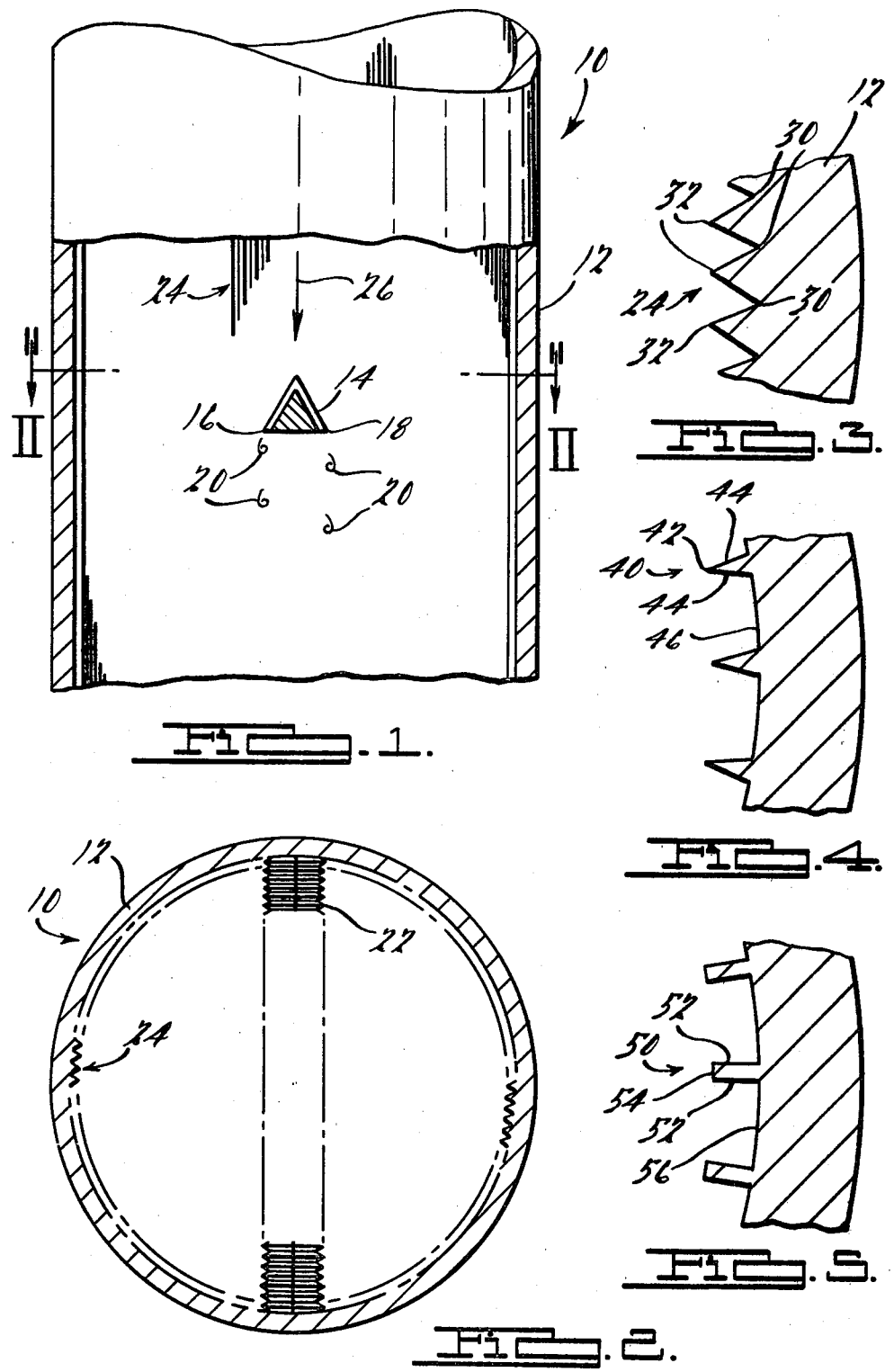

LOW NOISE VORTEX SHEDDING FLUID FLOW SENSOR

BACKGROUND OF THE INVENTION

1. Field of the Invention

This invention relates to measurement of fluid flow.

2. Prior Art

Various apparatus for the measurement of fluid velocity are known. First, a system for measuring the relative velocity between a body and a contiguous fluid includes an impeller or rotor which is rotatably pivoted on the body immersed in the fluid. Flow of the fluid relative to the body causes the impeller or rotor to rotate with an angular velocity dependent on the relative velocity between the body and the fluid. This rotation may operate, by electrical or mechanical means, an indicator which is suitably calibrated to indicate relative velocity. Disadvantages of such an arrangement include that the angular velocity of the impeller or rotor is not accurately proportional to the relative velocity between the fluid and the body.

An apparatus related to the previously discussed impeller rotor is a vane-like obstruction in the fluid path. The amount of deflection of the vane is proportional to the fluid velocity. Deflection of the vane can be sensed by any of a variety of means such as movement of a slider along a resistance thereby varying the resistance proportional to vane deflection.

Also known are hot wire fluid flow sensors wherein the motion of the fluid past a heated wire cools the wire. The amount of cooling is dependent upon the amount of fluid flowing past the wire. The amount of cooling of the wire can be determined by a resistance change which can be measured in any number of ways. Thus, a hot wire fluid flow sensor can measure the mass of the fluid flowing past the sensor. It is advantageous to know the mass of the air entering an internal combustion engine when establishing an air fuel ratio. Disadvantages of such an apparatus include that various impurities in the fluid may be deposited on the wire and cause an erroneous indication of fluid mass flow.

Another method of determining fluid velocity uses an object placed in the fluid flow to create a fluctuating flow of vortices in the wake of the object located in the fluid, i.e., Karman vortices. Alternatively, vanes can be placed in the fluid flow to induce a swirl having a cork screw shape. The rate of passage of the ridges and troughs of the cork screw are an indication of fluid velocity.

It is known that the Karman vortices tend to be formed on the downstream side of the object at regular intervals and alternately, first behind one side or edge of the object and then behind the opposite side or edge. The vortices detach themselves from the object in two nearly parallel rows and are carried downstream at a velocity substantially proportional to, but somewhat less than, the relative velocity of the fluid. That is, the vortices have a slip velocity which tends to bear a constant ratio to the velocity of the fluid. It is also well known that in each row the vortices are formed at a distance apart which tends to bear a constant ratio to the size of the object but substantially independent of the relative velocity of the fluid. From these considerations it has been shown that the frequency at which vortices are formed behind either side or edge of a cylinder tends to be proportional to the relative velocity of the fluid and inversely proportional to the size of the cylinder, but to depend substantially upon no other factor or parameter.

The phenomenon of alternate vortex formation in two rows in this way occurs frequently in the natural world, and is known to be the cause of, for example the "singing" of telegraph wires in the wind, the "sighing" and "roaring" of wind in trees, and the "whistling" of wind through tall grasses.

However, reliable, accurate and inexpensive measurement of these vortices to determine fluid flow has presented a problem. For example, U.S. Pat. No. 3,116,639 issued to W. G. Bird teaches positioning a vane-like element mounted for oscillatory movement about an axis extending at right angles to the direction of flow of the fluid and positioned downstream of the vortex generator. The frequency of oscillation of the vane-like element is measured and is related to the frequency with which vortices pass the element. The response time of such a system is, of course, related to the mechanical response of the system. That is, the vane-like element may not be able to respond to the changes in velocity. Further, the strength of the vortices must be sufficiently strong to cause movement of the vane-like element.

Another method and apparatus for determining the passage of a vortex is taught in U.S. Pat. No. 3,680,375 issued to R. D. Joy et al. A sonic signal transmitting transducer is located on one side of the wake of vortices and a sonic signal receiving transducer is located on the other side of the wake. The transmitting transducer signal is modulated by the Karman vortices and received by the receiving transducer. An electronic signal detector is connected to the signal receiving transducer for detecting the modulations created by the Karman vortices. Here again, the vortices must be of sufficient magnitude to cause modulation of the sonic signal. Further, modulation of a sonic signal may occur due to disturbances in the fluid flow other than vortices thus causing erroneous signals. That is, the turbulence or random velocity fluctuations within the fluid stream are similar to the vortices generated by the vortex generator. These turbulent fluctuations result from obstacles that the fluid previously encountered as well as the turbulence generated at the wall boundary layer. Recent studies suggest that the turbulence at the wall is formed by random turbulence bursts. Minimizing these turbulent bursts will result in a lower noise and thus an increased signal to noise ratio. This invention overcomes some of these problems by reducing the turbulence generated at the wall by controlling these turbulent bursts.

Also known are studies describing the drag and heat transfer characteristics of longitudinally ribbed surfaces. For example, in "Drag and Heat-Transfer Characteristics of Small Longitudinally Ribbed Surfaces", by M. J. Walsh and L. M. Weinstein, *AIAA Journal,* Vol. 17, No. 7, pp. 770 and 771, 1978, longitudinally ribbed surfaces are examined with the purpose of confining turbulent bursts to regions of small transverse extent, thus altering the local turbulence production. Rectangular, triangular and razor blade rib geometrics were examined. "Drag Characteristics of V-Groove and Transverse Curvature Riblets" by Michael J. Walsh, *Viscous Flow Drag Reduction,* pp. 168–184, Vol. 72 of Progress in Astronautics and Aeronautics, published by AIAA, 1980, also examines the drag characteristics of longitudinally ribbed surfaces where the rib dimensions are the order of the initial turbulent wall burst region near the wall.

SUMMARY OF THE INVENTION

In accordance with an embodiment of this invention, an apparatus for measuring the velocity of fluid includes a bounded fluid stream and a vortex generating means positioned inside the fluid stream for generating a stream of vortices in the wake of the vortex generating means. A wall means provides at least a portion of the boundary around the stream of fluid and has positioned in it the vortex generating means. A wall rib means extends from the wall means into the stream of fluid flow and is elongated longitudinally in the direction of the stream of fluid flow for reducing turbulence and noise in the stream of fluid flow. The wall rib means has alternating troughs and ridges in a direction transverse to fluid flow. The vortex generating means is elongated in a direction transverse to the direction of fluid flow and includes generator rib means adjacent the stream of fluid flow and extending generally transversely to the direction of elongation of the vortex generating means so that the ribs extend generally longitudinally in the direction of the stream of fluid flow for reducing noise and turbulence in the stream of fluid flow. The generator rib means has alternating troughs and ridges in a direction transverse to fluid flow.

BRIEF DESCRIPTION OF THE DRAWINGS

FIG. 1 is a cross section along a longitudinal plane of a measuring apparatus in accordance with an embodiment of this invention;

FIG. 2 is a cross section taken along section line 2—2 of FIG. 1;

FIG. 3 is a cross section of a first type of ribbing in accordance with an embodiment of this invention and an enlargement of the ribbing shown in FIGS. 1 and 2;

FIG. 4 is a cross section of a second type of ribbing in accordance with an embodiment of this invention; and FIG. 5 is a cross section of a third type of ribbing in accordance with an embodiment of this invention.

DETAILED DESCRIPTION OF THE INVENTION

Referring to FIGS. 1 and 2, a flow meter 10 includes a generally circular boundary wall 12 and a vortex generator 14. Wall 12 forms a generally cylindrical container for a stream of fluid flow and vortex generator 14 extends generally transversely across the cylinder. Vortex generator 14 has a generally triangular cross section with trailing edges 16 and 18 for generating two streams of vortices having alternate formation of vortices 20. Vortex generator 14 has formed thereon ridges 22 on the sides upstream of trailing edges 16 and 18. Similarly, the interior of wall 12 has ridges 24 which extend longitudinally in a direction parallel to the fluid flow indicated by arrow 26 in FIG. 1.

Referring to FIG. 3, an enlarged view of a cross section of ridges 24 on wall 12 shows alternating troughs 30 and peaks 32 so as to form a generally zig-zag cross section.

Referring to FIG. 4, an alternate cross section for ridges 40 includes peaks 42 having two sides 44 extending towards the wall within increasing separation. Sides 44 extending from adjacent peaks 42 toward the wall do not intersect and are separated from another by a wall surface 46. As a result, ridge pattern 40 has ridges of generally triangular cross section spaced from one another by an intermediate relatively flat surface 46.

Referring to FIG. 5, a ridge pattern 50 includes ridges of relatively rectangular cross section with opposing parallel side surfaces 52 extending into the stream of fluid flow and connected by an end surface 54 at the maximum extent of ridge pattern 50 into the fluid flow. Side surfaces 52 extend away from end surface 54 to a wall surface 56. Wall surface 56 is longer than end surface 54 so that the spacing between adjacent ridges is greater than the width of the individual ridge. Advantageously, the cross sectional area of adjacent ridges in ridge pattern 50 is the same to promote uniform fluid flow.

In order to measure the fluid flow in the stream, the vortices are detected by any one of known detection means. However, detection is made more difficult by noise or other undesirable turbulence in a stream of fluid flow. A noise-free signal would provide the ideal relationship between the air flow and the frequency of detected vortices, and would make the flow meter device suitable for pulsating flow measurements in addition to steady state flow measurement. In addition to the free stream turbulance that exists throughout the flow field there are turbulent bursts initiated near the wall. These bursts of turbulence contribute to the noise and disorganization of the vortices behind the vortex generator. Therefore, reduction of the burst of turbulence from the wall will provide a more uniform signal with the desired quality for a useful fluid flow signal. Turbulent bursts can be reduced by about $20 \geqq 25\%$ with the use of longitudinal ribs. The quality of the signal from a vortex shedding type fluid flow meter can be increased thereby making the sensor more useful and a practical device in process and engine control systems by incorporating longitudinal ribs on the vortex generator strut and the inside wall of the flow meter itself.

Various modifications and variations will no doubt occur to those skilled in the various arts to which this invention pertains. For example, the particular cross section of the air flow guide as well as ribs may be varied from that disclosed herein. These and all other variations which basically rely on the teachings through which this disclosure has advanced the art are properly considered within the scope of this invention.

I claim:

1. An apparatus for measuring the velocity of fluid including:

a wall means for bounding a stream of fluid flow;

a vortex generating means positioned inside said wall means in the stream of fluid flow for generating a stream of vortices in the wake of said vortex generating means;

wall rib means extending from said wall means into the stream of fluid flow and extending longitudinally in the direction of the stream of fluid flow for reducing turbulence in the stream of fluid flow, said wall rib means having alternating troughs and ridges in a direction transverse to fluid flow; and said vortex generating means being elongated in a direction transverse to the direction of fluid flow and including generator rib means adjacent the stream of fluid flow and extending generally transverse to the direction of elongation of said vortex generating means so that said generator rib means extend generally longitudinally in the direction of the stream of fluid flow for reducing noise and turbulence in the stream of fluid flow, said generator rib means having alternating troughs and ridges in a direction transverse to fluid flow.

2. An apparatus for measuring the velocity of fluid as recited in claim 1 wherein said wall rib means and said generator rib means include alternately rising and falling surfaces thereby producing a generally zig-zag cross section.

3. An apparatus for measuring the velocity of fluid as recited in claim 1 wherein said wall rib means and said generator rib means include a plurality of spaced, generally parallel ridges extending into the stream of fluid flow from said wall means and said vortex generating means, respectively, a ridge having an edge from which two diverging surfaces extend with increasing separation, said surfaces terminating before intersecting the diverging surfaces of an adjacent ridge, so that a cross section of said ridge means is a generally triangular cross section spaced from an adjacent generally triangular cross section.

4. An apparatus for measuring the velocity of fluid as recited in claim 1 wherein said wall rib means and said generator rib means include a plurality of spaced, generally parallel ridges extending into the stream of fluid flow from said wall means, and said vortex generating means, respectively, a ridge having a generally rectangular cross section so that the ridge has two generally parallel side surfaces and a generally perpendicular end surface extending between the two side surfaces.

5. An apparatus for measuring the velocity of fluid as recited in claim 4 wherein the distance between adjacent ridges is greater than the distance between the side surfaces of the same ridge.

6. An apparatus for measuring the velocity of fluid as recited in claim 4 wherein all of said ridges have a substantially uniform cross section.

* * * * *